US 8,057,769 B2

(12) United States Patent
Barker et al.

(10) Patent No.: US 8,057,769 B2
(45) Date of Patent: Nov. 15, 2011

(54) METHOD FOR MAKING PHOSPHATE-BASED ELECTRODE ACTIVE MATERIALS

(75) Inventors: Jeremy Barker, Oxfordshire (GB); M. Yazid Saidi, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 779 days.

(21) Appl. No.: 12/135,271

(22) Filed: Jun. 9, 2008

(65) Prior Publication Data

US 2008/0241043 A1    Oct. 2, 2008

Related U.S. Application Data

(60) Continuation-in-part of application No. 11/734,678, filed on Apr. 12, 2007, now abandoned, which is a continuation of application No. 10/870,135, filed on Jun. 16, 2004, now Pat. No. 7,214,448, which is a division of application No. 10/014,822, filed on Oct. 26, 2001, now Pat. No. 6,777,132, which is a continuation-in-part of application No. 09/559,861, filed on Apr. 27, 2000, now Pat. No. 6,387,568.

(51) Int. Cl.
    *C01B 25/45*          (2006.01)
    *H01M 4/139*        (2010.01)

(52) U.S. Cl. ........ 423/306; 429/221; 429/223; 429/224; 429/231.9; 429/231.95

(58) Field of Classification Search ............... 429/218.1, 429/221, 223, 224, 231.9, 231.95; 423/306
See application file for complete search history.

(56) References Cited

U.S. PATENT DOCUMENTS

| | | |
|---|---|---|
| 3,736,184 A | 5/1973 | Dey et al. |
| 4,009,092 A | 2/1977 | Taylor |
| 4,049,891 A | 9/1977 | Hong et al. |
| 4,098,687 A | 7/1978 | Yang |
| 4,194,062 A | 3/1980 | Carides et al. |
| 4,260,668 A | 4/1981 | Lecerf et al. |
| 4,434,216 A | 2/1984 | Joshi et al. |
| 4,464,447 A | 8/1984 | Lazzari et al. |
| 4,477,541 A | 10/1984 | Fraioli |
| 4,512,905 A | 4/1985 | Clearfield et al. |

(Continued)

FOREIGN PATENT DOCUMENTS

EP              0 680 106 A1     11/1995

(Continued)

OTHER PUBLICATIONS

Andersson, A., et al., "Thermal Stability of LiFePO$_4$—based Cathodes", (2000), Electrochemical and Solid-State Letters, 3 (2), pp. 66-68.

(Continued)

*Primary Examiner* — Stephen J. Kalafut
(74) *Attorney, Agent, or Firm* — Cynthia S. Kovacevic; Brian T. Mangum; Roger A. Williams

(57) ABSTRACT

The invention is directed to synthesizing a phosphate-based electrode active material. The method includes the step of reacting two or more starting materials collectively containing at least a $PO_3^{3-}$ anion, an alkali metal and a metal which is redox active in the final reaction product, at a temperature and for a time sufficient to form the phosphate-based electrode active material.

16 Claims, 1 Drawing Sheet

U.S. PATENT DOCUMENTS

| | | | |
|---|---|---|---|
| 4,668,595 A | 5/1987 | Yoshino et al. | |
| 4,683,181 A | 7/1987 | Armand et al. | |
| 4,690,877 A | 9/1987 | Gabano et al. | |
| 4,707,422 A | 11/1987 | deNeufville et al. | |
| 4,792,504 A | 12/1988 | Schwab et al. | |
| 4,803,137 A | 2/1989 | Miyazaki et al. | |
| 4,830,939 A | 5/1989 | Lee et al. | |
| 4,925,752 A | 5/1990 | Fauteux et al. | |
| 4,935,317 A | 6/1990 | Fauteux et al. | |
| 4,985,317 A | 1/1991 | Adachi et al. | |
| 4,990,413 A | 2/1991 | Lee et al. | |
| 5,011,501 A | 4/1991 | Shackle et al. | |
| 5,028,500 A | 7/1991 | Fong et al. | |
| 5,037,712 A | 8/1991 | Shackle et al. | |
| 5,130,211 A | 7/1992 | Wilkinson et al. | |
| 5,232,794 A | 8/1993 | Krumpelt et al. | |
| 5,262,253 A | 11/1993 | Golovin | |
| 5,262,548 A | 11/1993 | Barone | |
| 5,296,436 A | 3/1994 | Bortinger | |
| 5,300,373 A | 4/1994 | Shackle | |
| 5,326,653 A | 7/1994 | Chang | |
| 5,399,447 A | 3/1995 | Chaloner-Gill et al. | |
| 5,411,820 A | 5/1995 | Chaloner-Gill | |
| 5,418,090 A | 5/1995 | Koksbang et al. | |
| 5,418,091 A | 5/1995 | Gozdz et al. | |
| 5,435,054 A | 7/1995 | Tonder et al. | |
| 5,456,000 A | 10/1995 | Gozdz et al. | |
| 5,460,904 A | 10/1995 | Gozdz et al. | |
| 5,463,179 A | 10/1995 | Chaloner-Gill et al. | |
| 5,482,795 A | 1/1996 | Chaloner-Gill | |
| 5,508,130 A | 4/1996 | Golovin | |
| 5,514,490 A | 5/1996 | Chen et al. | |
| 5,538,814 A | 7/1996 | Kamauchi et al. | |
| 5,540,741 A | 7/1996 | Gozdz et al. | |
| 5,541,020 A | 7/1996 | Golovin et al. | |
| 5,620,810 A | 4/1997 | Golovin et al. | |
| 5,643,695 A | 7/1997 | Barker et al. | |
| 5,660,948 A | 8/1997 | Barker | |
| 5,695,893 A | 12/1997 | Arai et al. | |
| 5,700,298 A | 12/1997 | Shi et al. | |
| 5,712,059 A | 1/1998 | Barker et al. | |
| 5,721,070 A | 2/1998 | Shackle | |
| 5,804,335 A | 9/1998 | Kamauchi et al. | |
| 5,830,602 A | 11/1998 | Barker et al. | |
| 5,851,504 A | 12/1998 | Barker et al. | |
| 5,869,207 A | 2/1999 | Saidi et al. | |
| 5,871,866 A | 2/1999 | Barker et al. | |
| 5,910,382 A | 6/1999 | Goodenough et al. | |
| 6,004,697 A | 12/1999 | Thackeray et al. | |
| 6,017,654 A | 1/2000 | Kumta et al. | |
| 6,020,087 A | 2/2000 | Gao | |
| 6,103,419 A | 8/2000 | Saidi et al. | |
| 6,136,472 A | 10/2000 | Barker et al. | |
| 6,153,333 A | 11/2000 | Barker | |
| 6,183,718 B1 | 2/2001 | Barker et al. | |
| 6,277,521 B1 | 8/2001 | Gao et al. | |
| 6,306,215 B1 | 10/2001 | Larkin | |
| 6,387,568 B1 | 5/2002 | Barker et al. | |
| 6,432,581 B1 | 8/2002 | Amatucci et al. | |
| 6,514,640 B1 | 2/2003 | Armand et al. | |
| 6,777,132 B2 | 8/2004 | Barker et al. | |
| 6,872,492 B2 | 3/2005 | Barker et al. | |
| 6,913,855 B2 * | 7/2005 | Stoker et al. | 429/231.95 |
| 6,986,968 B2 | 1/2006 | Hong et al. | |
| 7,217,448 B2 | 5/2007 | Barker et al. | |
| 2001/0055718 A1 | 12/2001 | Li et al. | |
| 2003/0190527 A1 | 10/2003 | Pugh et al. | |
| 2003/0190528 A1 | 10/2003 | Saidi et al. | |
| 2005/0164084 A1 | 7/2005 | Adamson et al. | |
| 2006/0014078 A1 | 1/2006 | Swoyer et al. | |
| 2008/0020277 A1 | 1/2008 | Barker et al. | |
| 2009/0117022 A1 * | 5/2009 | Nuspl et al. | 423/306 |

FOREIGN PATENT DOCUMENTS

| | | | |
|---|---|---|---|
| EP | 0 849 817 A1 | 6/1998 | |
| EP | 1 049 182 A2 | 11/2000 | |
| EP | 1 093 172 A1 | 4/2001 | |
| JP | 61 263069 A1 | 11/1986 | |
| JP | 06 251764 A1 | 9/1994 | |
| JP | 09 171827 A1 | 6/1997 | |
| JP | 2001 52733 A1 | 2/2001 | |
| JP | 2001 85010 A1 | 3/2001 | |
| WO | WO 98/12761 A1 | 3/1998 | |
| WO | WO 99/30378 A1 | 6/1999 | |
| WO | WO 00/01024 A1 | 1/2000 | |
| WO | WO 00/31812 A1 | 6/2000 | |
| WO | WO 00/57505 A1 | 9/2000 | |
| WO | WO 01/13443 A3 | 2/2001 | |
| WO | WO 01/53198 A1 | 7/2001 | |
| WO | WO 01/54212 A1 | 7/2001 | |
| WO | WO 01/84655 A1 | 11/2001 | |
| WO | WO 02/44084 A1 | 6/2002 | |
| WO | WO 02/097907 A2 | 12/2002 | |
| WO | WO-2009-127672 A1 * | 10/2009 | |
| WO | WO-2010-023194 A1 * | 3/2010 | |

OTHER PUBLICATIONS

Amine, K., et al., "Olivine LiCoPO$_4$ as 4.8 V Electrode Material for Lithium Batteries", (2000), Electrochemical and Solid-State Letters, 3(4), pp. 178-179.

Kirkby, et al., "Crystal Structure of Potassium Aluminum Fluoride Phosphate KAl$_1$FPO$_4$", Zeitschrift fur Kristallographie 956 (1995).

Nagornyi et al., "Preparation and Structure of the New Fluoride Phosphate Na$_5$CrF$_2$(PO$_4$)$_2$", Russian Journal of Inorganic Chemistry 35, 470, (1990).

Arlt, et al., "Na$_5$AlF$_2$(PO$_4$)$_2$ : Darstellung, Kristallstrukturund Ionenleitfahigkeit", Z anorg. Allg. Chem. 547, 179 (1987).

www.webmineral.com/data/Amblygonite.shtml.

www.webmineral.com/data/Lacroixite.shtml.

www.webmineral.com/data/Montebrasite.shtml.

www.webmineral.com/data/Tavorite.shtml.

www.webmineral.com/data/Graphite.shtml.

International Search Report for PCT/US97/15544.

Rangan et al., "New Titanium-Vanadium Phosphates of Nasicon and Langbeinite Structures, and Differences Between the Two Structures Toward Deintercalation of Alkali Metal", Journal of Solid State Chemistry, 109, (1994) pp. 116-121.

Delmas et al., "The Nasicon-Type Titanium Phosphates ATi$_2$(PO$_4$)$_3$(A=Li, Na) as Electrode Materials", Solid State Ionics (1988) 28-30 pp. 419-423.

Hagenmuller et al., "Intercalation in 3D-Skeleton Structures: Ionic and Electronic Features", Material Resources Society Symposium Proc., vol. 210 (1991) pp. 323-334.

Chemical Abstracts Service, (1997), XP 2048304.

Padhi et al., "Lithium Intercalation into Nasicon-Type Mixed Phosphates: . . . and Li$_2$FeTi(PO$_4$)$_3$", 37$^{th}$ Power Sources Conference, Cherry Hill, New Jersey; Conference Date: Jun. 17-20, 1996, published Oct. 15, 1996.

Sisler et al., "Chemistry a Systematic Approach", Oxford University Press, p. 746, 1980.

Gopalakrishnan et al., "V$_2$(PO$_4$)$_3$: A Novel Nasicon-Type Vanadium Phosphate Synthesized by Oxidative Deintercalation of Sodium From Na$_3$V$_2$(PO$_4$)$_3$", Chemistry of Materials, vol. 4, No. 4, Jul./Aug. 1992, pp. 745-747.

Delmas et al., "The Chemical Short Circuit Method, An Improvement in the Intercalation-Deintercalation Techniques", Materials Research Bulletin, vol. 23, 1988, pp. 65-72.

Ivanov-Schitz et al., "Electrical and Interfacial Properties of a Li$_3$Fe$_2$(PO$_4$)$_3$ Single Crystal With Silver Electrodes", Solid State Ionics, 91, (1996), pp. 93-99.

Cretin et al., "Study of Li$_{1+x}$Al$_x$Ti$_{2-x}$(PO$_4$)$_3$ for Li + Potentiometric Sensors", Journal of the European Ceramic Society 15, (1995), pp. 1149-1156.

Chemical Abstracts Services, (1995) XP 2048305.

Patent Abstracts of Japan (1994) vol. 18, No. 64, (Abstract for JP 06251764).

Okada et al., "Fe$_2$(SO$_4$)$_3$ as a Cathode Material for Rechargeable Lithium Batteries", Center for Materials Science & Engineering, University of Texas, Austin, Texas, (no date of publication).

Adachi et al., "Lithium Ion Conductive Solid Electrolyte", Chemical Abstracts 112 129692 (1981).

Delmas et al., "A Nasicon-Type Phase As Intercalation Electrode: Sodium Titatium Phosphate [NaTi$_2$(PO$_4$)$_3$]", Material Resources Bulletin (1987).

Nanjundaswamy et al., "Synthesis, Redox Potential Evaluation and Electrochemical Characteristics of Nasicon-Related 3D Framework Compounds", Solid State Ionics 92, (1996) pp. 1-10.

Nadiri, "Lithium Intercalation in Lithium Titanium Phosphate [LiTi$_2$(PO$_4$)$_3$]", C.R. Acad. Sci., Ser. 2 (1987), 304 (9), pp. 415-418 (no month available).

Cotton et al., "Advanced Inorganic Chemistry, 3$^{rd}$ Edition", Interscience Publishers, pp. 864-868 (no month available).

Linden, "Handbook of Batteries, 2$^{nd}$ Edition", McGraw-Hill, Inc. pp. 36.4-36.9.

Bykov et al., "Superionic Conductors Li$_3$M$_2$(PO$_4$)$_3$ (M=Fe, Sc, Cr): Synthesis, Structure and Electrophysical Properties", Solid State Ionics, vol. 38 (1990) pp. 31-52 (no month available).

Genkina et al., "Crystal Structure of Synthetic Tavorite LiFe[PO$_4$](OH,F)", Kristallografiya (1984), 29 (1) 50-5.

Genkina et al., "Phase Formation and Crystallochemistry of Iron Phosphates . . .", Izv. Akad. Nauk SSR, Neorg. Mater. (1988), 24 (7), pp. 1158-1162, abstract only.

Dutreilh et al., "Synthesis and Crystal Structure of a New Lithium Nickel Fluorophosphates Li$_2$[NiF(PO$_4$)] . . . ", Journal of Solid State Chemistry, 142, pp. 1-5 (1999).

M-T Averbuch-Pouchot et al., "Topics in Phosphate Chemistry", World Scientific Publishing Co., Singapore (1996), pp. 106-119.

Loiseau et al., "NH$_4$FePO$_4$F: Structural Study and Magnetic Properties", Journal of Solid State Chemistry III, pp. 390-396 (1994).

LeMeins et al., "Phase Transitions in the Na$_3$M$_2$(PO$_4$)F$_3$ Family (M=Al$^{3+}$,V$^{3+}$,Cr$^{3+}$Fe$^{3+}$,Ga$^{3+}$): Synthesis, Thermal, Structural, and Magnetic Studies", Journal of Solid State Chemistry 148, pp. 260-277 (1999).

Moss et al., "On the X-Ray Identification of Amblygonite and Montebrasite", Mineralogical Magazine, vol. 37, No. 287, pp. 414-422 (1969).

Goodenough et al., "Phospho-Olivines as Positive Electrode Materials for Rechargeable Lithium Batteries", Journal of the Electrochemical Society, vol. 144, No. 4, pp. 1188-1194 (1997).

Yakubovich et al., "The Mixed Anionic Framework in the Structure of Na$_2$[MnF(PO$_4$)]", Acta Crystallographica Section C, Crystal Structure Communications, vol. C53, Part 4, pp. 395-397 (1997).

LeMeins et al., "Ionic Conductivity of Crystalline and Amorphous Na$_3$Al$_2$(PO$_4$),F$_3$", Solid State Ionics Diffusion & Reactions, vol. 111, pp. 67-75 (1998).

PCT International Search Report PCT/US01/08132 dated Sep. 27, 2001.

Reddy and Hossain (Editor Linden), "Rechargeable Lithium Batteries (Ambient Temperature)", Handbook of Batteries Third Edition, pp. 34.1-34.62.

Rinaldi et al., "The Crystal Structure of Graphite, Complex Phosphate Not a Garnetoid" Bulletin de Mineralogie, vol. 101(5-6), pp. 453-457 (1978).

PCT International. Search Report for PCT/US02/33510.

* cited by examiner

METHOD FOR MAKING PHOSPHATE-BASED ELECTRODE ACTIVE MATERIALS

This application is a continuation-in-part of application Ser. No. 11/734,678 filed Apr. 12, 2007, now abandoned, which is a continuation of U.S. patent application Ser. No. 10/870,135 filed Jun. 16, 2004, issued as U.S. Pat. No. 7,214,448, which is a divisional of U.S. patent application Ser. No. 10/014,822, filed Oct. 26, 2001, issued as U.S. Pat. No. 6,777,132, which is a continuation-in-part of U.S. patent application Ser. No. 09/559,861, filed Apr. 27, 2000, issued as U.S. Pat. No. 6,387,568.

FIELD OF THE INVENTION

This invention relates to an improved method for making phosphate-based electrode active materials intended for use in secondary electrochemical cells.

BACKGROUND OF THE INVENTION

A battery consists of one or more electrochemical cells, wherein each cell typically includes at least a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

SUMMARY OF THE INVENTION

The present invention is directed to a novel method for making phosphate-based electrode active materials. The method includes the step of reacting two or more starting materials collectively containing at least a $PO_3^{3-}$ anion, an alkali metal and a metal which is redox active in the final reaction product, at a temperature and for a time sufficient to form the phosphate-based electrode active material.

DETAILED DESCRIPTION OF THE PREFERRED EMBODIMENTS

Figure 1:
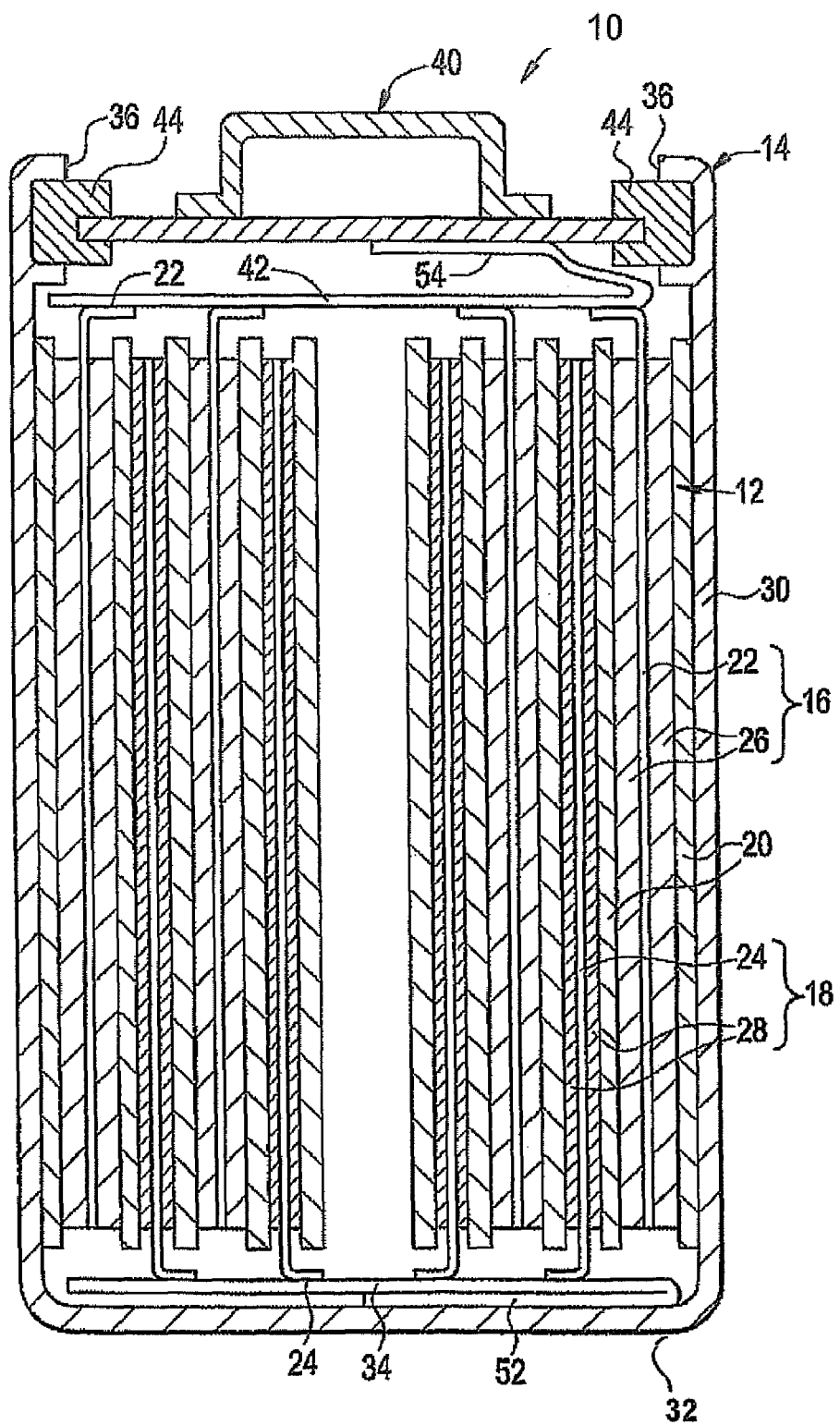
FIG. 1 is a schematic cross-sectional diagram illustrating the structure of a non-aqueous electrolyte cylindrical electrochemical cell of the present invention.

It has been found that the novel methods of this invention affords benefits over such methods among those known in the art. Such benefits include, without limitation, one or more of ease of manufacture, greater yields, faster reaction times, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention is directed to a method for making phosphate-based electrode active materials by reacting two or more starting materials collectively containing at least PO3, an alkali metal and a metal which is redox active in the final reaction product, at a temperature and for a time sufficient to form a phosphate-based electrode active material represented by the general formula (1):

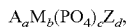

wherein:
(a) A is selected from the group consisting of elements from Group I of the Periodic Table, and mixtures thereof, and $0 < a \leq 9$;
(b) M includes at least one redox active element, and $1 \leq b \leq 3$;
(c) $1 \leq c \leq 3$;
(d) Z is selected from the group consisting of a hydroxyl (OH), halogens selected from Group 17 of the Periodic Table, and mixtures thereof, and $0 \leq d \leq 4$; and wherein A, M, Z, a, b, c and d are selected so as to achieve electroneutrality of the phosphate-based electrode active material in its nascent or as-synthesized state, as generally governed by the formula $a+b(V^M)=3c+d$, wherein $V^M$ is the valence state of component M in the active material's nascent or as-synthesized state.

Unless otherwise specified, a variable described herein algebraically as equal to ("="), less than or equal to ("≦"), or greater than or equal to ("≧") a number is intended to subsume values or ranges of values about equal or functionally equivalent to the number. As referred to herein, "Group" refers to the Group numbers (i.e., columns) of the Periodic Table as defined in the current IUPAC Periodic Table. (See, for example, U.S. Pat. No. 6,136,472 to Barker et al., incorporated by reference herein.) In addition, the recitation of a genus of elements, materials or other components, from which an individual component or mixture of components can be selected, is intended to include all possible sub-generic combinations of the listed components, and mixtures thereof. Also, "include," and its variants, is intended to be non-limiting, such that recitation of items in a list is not to the exclusion of other like items that may also be useful in the materials, compositions, devices, and methods of this invention.

As referred to herein "electroneutrality" is the state of the electrode active material wherein the sum of the positively charged species (composition variables A and M of general formula (1)) in the material is equal to the sum of the negatively charged species ($PO_4$ and composition variable Z of general formula (1)). The stoichiometric values of one or more elements of the composition may take on non-integer values.

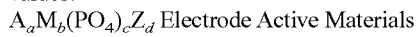  Electrode Active Materials

Referring again to electrode active materials represented by general formula (1), namely $A_aM_b(PO_4)_cZ_d$, for all embodiments described herein, composition variable A is selected from the group consisting of elements from Group I of the Periodic Table, and mixtures thereof (for example $A_a=A_{a-a'}A'_{a'}$, wherein A and A' are each selected from the group consisting of elements from Group I of the Periodic Table and are different from one another, and a'<a). In one subembodiment, A is selected from the group consisting of Li (Lithium), Na (Sodium), K (Potassium), and mixtures thereof. In another subembodiment, A is selected from the group consisting of Na, and a mixture of Na with K, and a mixture of Na with Li. In one subembodiment, A is Li.

A sufficient quantity (a) of composition variable A should be present in the active material so as to allow all of the "redox active" elements of composition variable M (as defined herein below) to undergo oxidation/reduction during cycling of the active material. In one embodiment, $0 \leq a \leq 6$. In another embodiment, $0 < a \leq 4$. In another embodiment, $1 \leq a \leq 2$.

Removal of an amount (a) of composition variable A from the electrode active material is accompanied by a change in oxidation state of at least one of the "redox active" elements in the active material, as defined herein below. The amount of redox active material available for oxidation/reduction in the active material determines the amount (a) of composition variable A that may be removed. Such concepts are, in general application, known in the art, for example, as disclosed in U.S. Pat. No. 4,477,541 to Fraioli and U.S. Pat. No. 6,136,472 to Barker, et al., both of which are incorporated by reference herein.

In general, the amount (a) of composition variable A in the active material varies during charge/discharge. Where the active materials are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (a") of composition variable A is removed from the active material as described above. The resulting structure, containing less amount of composition variable A (i.e., a–a") than in the nascent or as-prepared state, and at least one of the redox active components having a higher oxidation state than in the as-prepared state, while essentially maintaining the original stoichiometric values of the remaining components (M and Z). The active materials include such materials in their nascent state (i.e., as manufactured prior to inclusion in an electrode) and materials formed during operation of the battery (i.e., by insertion or removal of A).

Referring again to general formula (1), in all embodiments described herein, composition variable M includes at least one redox active element. As used herein, the term "redox active element" includes those elements characterized as being capable of undergoing oxidation/reduction to another oxidation state when the electrochemical cell containing the electrode active material is operating under normal operating conditions. As used herein, the term "normal operating conditions" refers to the intended voltage at which the cell is charged, which, in turn, depends on the materials used to construct the cell.

Redox active elements useful herein with respect to composition variable M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. For each embodiment described herein, M may comprise a mixture of oxidation states for a particular element (for example, $M=Mn^{2+}Mn^{4+}$).

In one embodiment, composition variable M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, composition variable M includes one or more redox active elements and one or more non-redox active elements. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, $M_b=MI_n MII_o$, wherein $1 \leq o+n \leq 3$ and each of o and n is greater than zero (o,n>0), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts. "Isocharge substitution" refers to a substitution of one element on a given crystallographic site with an element having the same oxidation state (for example substitution of $Fe^{2+}$ with $Mg^{2+}$). "Aliovalent substitution" refers to a substitution of one element on a given crystallographic site with an element having a different oxidation state (for example substitution of $Fe^{2+}$ with $Li^+$).

For all embodiments described herein where MI is partially substituted by MII by isocharge substitution, MI may be substituted by an equal stoichiometric amount of MII, whereby $M_b=MI_{n-o}MII_o$, $1 \leq n \leq 3$ and $0<o<n$. Where MI is partially substituted by MII by isocharge substitution and the stoichiometric amount of MI is not equal to the amount of MII, whereby $M_b=MI_{n-q}MII_o$, $o \neq q$, $1 \leq n \leq 3$, $q<n$, and $0<o<q$, then the stoichiometric amount of one or more of the other components (A, $PO_4$ and Z) in the active material must be adjusted in order to achieve electroneutrality.

For all embodiments described herein where MI is partially substituted by MII by aliovalent substitution and an equal amount of MI is substituted by an equal amount of MII, whereby $M_b=MI_{n-o}MII_o$, then the stoichiometric amount of one or more of the other components (A, $PO_4$ and Z) in the active material must be adjusted in order to maintain electroneutrality. However, MI may be partially substituted by MII by aliovalent substitution by substituting an "oxidatively" equivalent amount of MII for MI, whereby $$M_b = MI_{n-\frac{o}{V^{MI}}} MII_{\frac{o}{V^{MII}}},$$

wherein $V^{MI}$ is the oxidation state of MI, and $V^{MII}$ is the oxidation state of MII, and wherein $1 \leq n \leq 3$ and $0<o<n$.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals from Group I of the Periodic Table, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals from Group I of the Periodic Table, $Cu^{1+}$, $Ag^{1+}$ and mixtures thereof.

In another embodiment, $M_b = M1_q M2_r M3_s$, wherein:
 (i) M1 is a redox active element with a 2+ oxidation state;
 (ii) M2 is selected from the group consisting of redox and non-redox active elements with a 1+ oxidation state;
 (iii) M3 is selected from the group consisting of redox and non-redox active elements with a 3+ or greater oxidation state; and
 (iv) at least one of q, r and s is greater than 0, $1 \leq q+r+s \leq 3$, and at least one of M1, M2, and M3 is redox active.

In one subembodiment, q, r and s>0. In another subembodiment, M1 is substituted by a stoichiometrically equal amount of M2 and/or M3, whereby $M_b = M1_{q-(r+s)} M2_r M3_s$, wherein $1 \leq q+r+s \leq 3$ and $0 < r,s < q$, and q,r,s>0. In this subembodiment, then the stoichiometric amount of one or more of the other components (A, $PO_4$ and Z) in the active material may be adjusted in order to maintain electroneutrality.

In another subembodiment, M1 is substituted by an "oxidatively" equivalent amount of M2 and/or M3, whereby $$M_b = M1_{q - \frac{r}{V^{M1}} - \frac{s}{V^{M1}}} M2_{\frac{r}{V^{M2}}} M3_{\frac{s}{V^{M3}}},$$

wherein $1 \leq q \leq 3$ and $0 < r,s < q$, wherein $V^{M1}$ is the oxidation state of M1, $V^{M2}$ is the oxidation state of M2, and $V^{M3}$ is the oxidation state of M3, and wherein $1 \leq q \leq 3$ and $0 < r,s < q$, and q,r,s>0.

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$ and mixtures thereof. In another subembodiment, M1 and M3 are selected from their respective preceding groups, and M2 is selected from the group consisting of $Li^{1+}$, $K^{1+}$, $Na^{1+}$, $R^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$ and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

For all embodiments described herein, $1 < c \leq 3$. In one subembodiment, c=1. In another subembodiment, c=3.

In all embodiments described herein, composition variable Z is selected from the group consisting of OH (Hydroxyl), halogens selected from Group 17 of the Periodic Table, and mixtures thereof. In one subembodiment, Z is selected from the group consisting of OH, F (Fluorine), Cl (Chlorine), Br (Bromine), and mixtures thereof. In another subembodiment, Z is OH. In another embodiment, Z is F. In another subembodiment, Z is a mixture of F with one of OH, Cl, and Br. In one subembodiment, $0 < d \leq 4$. In another subembodiment, $0 < d \leq 1$.

Non-limiting examples of electrode active materials represented by general formula (1) include the following: $LiFePO_4$; $LiCoPO_4$; $LiMnPO_4$; $LiMn_{0.8}Fe_{0.2}PO_4$; $LiMn_{0.9}Fe_{0.8}PO_4$; $LiFe_{0.9}Mg_{0.1}PO_4$; $LiFe_{0.8}Mg_{0.2}PO_4$; $LiFe_{0.95}Mg_{0.05}PO_4$; $LiFe_{0.95}Nb_{0.05}PO_4$; $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiVOPO_4$; $Li(VO)_{0.75}Mn_{0.25}PO_4$; $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $LiVPO_4F$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)_2F_3$; $LiV_{0.9}Al_{0.1}PO_4F$; $LiFePO_4F$; $LiTiPO_4F$; and $LiCrPO_4F$.

Starting Materials and Reaction Conditions

Active materials represented by general formula (1) are readily synthesized by reacting starting materials in a solid state reaction, with or without simultaneous oxidation or reduction of the metal species involved.

A starting material may provide more than one of composition components A, M, $PO_4$ and (optionally) Z. In various embodiments of the invention, starting materials are provided that combine, for example, composition components A and Z. Combinations of starting materials providing each of the components may also be used. It is preferred to select starting materials with counterions that give rise to volatile by-products which can be readily removed from the reaction mixture.

Precursor compounds useful herein for supplying composition variable A include alkali metal hydroxides, cyanates, nitrates, nitrites, sulfates, hydrogen sulfates, sulfites, bisulfites, carbonates, bicarbonates, borates, oxides, acetates, oxalates, and mixtures thereof. Precursor compounds useful herein for supplying composition variable A as well as one or more of the other composition variables include alkali-metal fluorides, chlorides, bromides, iodides, phosphites, ammonium phosphites, substituted phosphates, and mixtures thereof. Examples of alkali metal-containing precursors suitable for synthesizing the active materials described herein include: AZ (for example LiF and NaF), $A_3PO_3$ (for example $Li_3PO_3$ and $Li_2NaPO_3$), $A_xH_{3-x}PO_3$ wherein x>0 (for example $Li_2HPO_3$ and $NaLiHPO_3$), $A_2PO_3Z.H_2O$ (for example $Li_2PO_3F.H_2O$), $A_2PO_3Z$ (for example $Li_2PO_3OH$ and $LiNaPO_3F$), $ANH_4PO_3Z$ (for example $LiNH_4PO_3F$ and $NaNH_4PO_3OH$), $A_4(PO_3Z)_2$ (for example $Na_4(PO_3F)_2$ and $Li_3Na(PO_3Cl)_2$) and $APO_3Z.2H_2O$ (for example $LiPO_3F.2H_2O$), wherein A and Z are as described herein above.

Precursor compounds useful herein for supplying composition variable M include M-containing fluorides, chlorides, bromides, iodides, cyanates, nitrates, nitrites, sulfates, hydrogen sulfates, sulfites, bisulfites, carbonates, bicarbonates, borates, phosphites, ammonium phosphites, substituted phosphates, hydroxides, acetates, oxalates, and mixtures thereof. The elements in the starting materials may have any oxidation state, depending the oxidation state required in the target reaction product and the oxidizing or reducing conditions contemplated, as discussed below. Examples of M-containing precursors suitable for synthesizing the active materials described herein include: $MPO_3Z$ (for example $MnPO_3F$), $MHPO_3Z$, $MHPO_3$ (for example $CoHPO_3$), and $MPO_3$ (for example $FePO_3$), wherein M and Z are as described herein above.

For all embodiments described herein, the phosphate component in the active material is provided for by one or more $PO_3^{3-}$-containing precursors. Such $PO_3^{3-}$-containing precursors contain one or more counter-cations selected from the group consisting of alkali metals, alkaline metals, transition metals, or other non-transition metals, as well as complex cations such as ammonium or quaternary ammonium. The $PO_3^{3-}$-containing precursor may be a phosphite or a substituted phosphate. The $PO_3^{3-}$-containing precursor may also include anions such as fluoride, chloride, bromide, iodide, and mixtures thereof. Examples of $PO_3^{3-}$-containing precursors suitable for synthesizing the active materials described herein include $A_2PO_3Z$, $AHPO_3Z$, $(NH_4)_2PO_3Z.H_2O$, $A_2PO_3Z.H_2O$, $ANH_4PO_3Z$, $A_4(PO_3Z)_2$ and $APO_3Z.2H_2O$, wherein A and Z are as described herein above.

It is preferred to synthesize the active materials of the invention using stoichiometric amounts of the starting materials, based on the desired composition of the reaction product expressed stoichiometric variables a, b, c and d of general formula (1). Alternatively it is possible to run the reaction with a stoichiometric excess of one or more of the starting materials. In such a case, the stoichiometry of the product active material will be determined by the limiting reagent among the components. There will also be at least some unreacted starting material in the reaction product mixture. Because such impurities in the active materials are generally undesirable (with the exception of reducing carbon, discussed below), it is generally preferred to provide relatively exact molar amounts of all the starting material starting materials.

In one embodiment, the electrode material is synthesized via a solid state reaction method. The starting materials are provided in powder or particulate form. The powders are mixed together with any of a variety of procedures, such as by ball milling, blending in a mortar and pestle, and the like. Thereafter the mixture of powdered starting materials may be compressed into a pellet and/or held together with a binder material to form a closely cohering reaction mixture. The reaction mixture is heated in an oven, generally at a temperature of about 400° C. or greater until the electrode active material reaction product forms.

In another embodiment, the electrode material is synthesized via a hydrothermal method. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

In one embodiment, the electrode material is synthesized under reducing or oxidizing conditions. When the reaction is carried out under reducing conditions, one or more of the elements in the starting materials is reduced in oxidation state relative to the reaction product (electrode active material). Oxidizing conditions may be provided by running the reaction in air. Thus, oxygen from the air is used to oxidize the starting material containing the transition metal.

Reaction may be carried out in a reducing atmosphere such as hydrogen, ammonia, methane, or a mixture of reducing gases. Alternatively, the reduction may be carried out in-situ by including in the reaction mixture a reductant that will participate in the reaction, but that will produce by-products that will not interfere with the active material when used later in an electrode or an electrochemical cell.

In one aspect, the reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide. The starting materials are mixed together with carbon, which is included in an amount sufficient to reduce one or more of the metal(s) of composition variable M of general formula (1), without full reduction to an elemental metal state. (Excess quantities of the reducing carbon may be used to enhance product quality.) An excess of carbon, remaining after the reaction, functions as a conductive constituent in the electrode active material. This is an advantage since such remaining carbon is very intimately mixed with the product active material. Accordingly, large quantities of excess carbon, on the order of 100% excess carbon or greater, are useable in the process. In a preferred embodiment, the carbon present during compound formation is intimately dispersed throughout the precursor and product. This provides many advantages, including the enhanced conductivity of the product. In a preferred embodiment, the presence of carbon particles in the starting materials also provides nucleation sites for the production of the product crystals.

Alternatively or in addition, the source of reducing carbon may be provided by an organic material. The organic material is characterized as containing carbon and at least one other element, preferably hydrogen. The organic material generally forms a decomposition product, referred to herein as a carbonaceous material, upon heating the reactants. Without being bound by any one theory, representative decomposition processes that can lead to the formation of the carbonaceous material include pyrolization, carbonization, coking, destructive distillation, and the like. These process names, as well as the term thermal decomposition, are used interchangeably herein to refer to the process by which a decomposition product capable of acting as a reductant is formed upon heating of a reaction mixture containing an organic material.

A typical decomposition product contains carbonaceous material. In one embodiment, during the reaction at least a portion of the carbonaceous material formed participates as a reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction.

In one embodiment, some of the organic material providing reducing power is oxidized to a non-volatile component, such as for example, oxygen-containing carbon materials such as alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will preferably be enriched in carbon relative to the mole percent carbon present in the organic material. The carbonaceous material preferably contains from about 50 up to about 100 mole percent carbon.

While in some embodiments the organic precursor material forms a carbonaceous decomposition product that acts as a reductant as discussed above with respect to elemental carbon, in other embodiments a portion of the organic material may participate as reductant without first undergoing a decomposition. The invention is not limited by the exact mechanism or mechanisms of the underlying reduction processes.

As with elemental carbon, reactions with the organic precursor material are conveniently carried out by combining starting materials and heating. In this embodiment, the organic material decomposes to form a decomposition product capable of acting as a reductant. In another embodiment, the organic material may be decomposed in a separate step to form a decomposition product. The decomposition product may then be combined with the remaining reactants to form a mixture. The mixture may then be heated for a time and at a temperature sufficient to form a reaction product.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as halogens, oxygen, nitrogen, phosphorus, and sulfur, may be present in the organic material, as long as they do not significantly interfere with the decomposition process or otherwise prevent the reductions from being carried out. Precursors include organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include starch, cellulose, and their ether or ester derivatives. Other derivatives include the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ include ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include sucrose, maltose, lactose, trehalose, gentiobiose, cellobiose, and melibiose. Three-ring (trisaccharides such as raffinose) and higher oligomeric and polymer carbohydrates may also be used. Examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as glycerol, sorbitol, mannitol, iditol, dulcitol, talitol, arabitol, xylitol, and adonitol, as well as "slightly oxidized" carbohydrates such as gluconic, mannonic, glucuronic, galacturonic, mannuronic, saccharic, manosaccharic, ido-saccharic, mucic, talo-mucic, and allo-mucic acids, The formula of the slightly oxidized and the slightly reduced carbohydrates is similar to that of the carbohydrates.

A preferred carbohydrate is sucrose. Under the reaction conditions, sucrose melts at about 150-180° C. Preferably, the liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in-situ. The reaction proceeds with carbothermal reduction, The liquid precursor materials may also advantageously serve or function as a binder in the starting material mixture as noted above.

Reducing carbon is preferably used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is generally higher than 14. For example, in carbohydrates it is about 30 g/equivalent. Examples of carbohydrates include sugars such as glucose, fructose, and sucrose, as well as polymers such as cellulose and starch.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

In a preferred embodiment, reduction is carried out in a reducing atmosphere in the presence of a reductant as discussed above. The term "reducing atmosphere" as used herein means a gas or mixture of gases that is capable of providing reducing power for a reaction that is carried out in the atmosphere. Reducing atmospheres preferably contain one or more so-called reducing gases. Examples of reducing gases include hydrogen, carbon monoxide, methane, and ammonia, as well as mixtures thereof. Reducing atmospheres also preferably have little or no oxidizing gases such as air or oxygen. If any oxidizing gas is present in the reducing atmosphere, it is preferably present at a level low enough that it does not significantly interfere with any reduction processes taking place.

When using a reducing atmosphere, it is difficult to provide less than an excess of reducing gas such as hydrogen. Under such as a situation, it is preferred to control the stoichiometry of the reaction by the other limiting reagents. Alternatively the reduction may be carried out in the presence of reducing carbon such as elemental carbon. Experimentally, it would be possible to use precise amounts of reductant carbon to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

Before reacting the mixture of starting materials, the particles of the starting materials are intermingled. Preferably, the starting materials are in particulate form, and the intermingling results in an essentially homogeneous powder mixture of the precursors. In one embodiment, the precursor powders are dry-mixed using, for example, a ball mill. Then the mixed powders are pressed into pellets. In another embodiment, the precursor powders are mixed with a binder. The binder is preferably selected so as not to inhibit reaction between particles of the powders. Preferred binders decompose or evaporate at a temperature less than the reaction temperature. Examples include mineral oils, glycerol, and polymers that decompose or carbonize to form a carbon residue before the reaction starts, or that evaporate before the reaction starts. In one embodiment, the binders used to hold the solid particles also function as sources of reducing carbon, as described above. In still another embodiment, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials include a reducing agent, the reaction product is a transition metal compound having at least one transition metal in a lower oxidation state relative to its oxidation state in the starting materials.

Preferably, the particulate starting materials are heated to a temperature below the melting point of the starting materials. Preferably, at least a portion of the starting material remains in the solid state during the reaction.

The temperature should preferably be about 400° C. or greater, and desirably about 450° C. or greater, and preferably about 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than about 600° C.; most desirably greater than about 650° C.; preferably about 700° C. or greater; more preferably about 750° C. or greater. Suitable ranges for many reactions are from about 700 to about 950° C., or from about 700 to about 800° C.

The general aspects of the above synthesis routes are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrochemical Cells

The present invention also provides an electrochemical cell or battery containing:

(a) a first electrode (also commonly referred to as a positive electrode or cathode) which includes an active material of the present invention;

(b) a second electrode (also commonly referred to as a negative electrode or anode) which is a counter-electrode to the first electrode; and (c) an electrolyte in ion-transfer communication with the first and second electrodes.

The architecture of a battery is not limited to any particular architecture, and may be selected from the group consisting of cylindrical wound designs, z-fold designs, wound prismatic and flat-plate prismatic designs, and polymer laminate designs.

Referring to FIG. 1, in one embodiment the electrochemical cell 10 includes a spirally coiled or wound electrode assembly 12 enclosed in a sealed container, preferably a rigid cylindrical casing 14 as illustrated in FIG. 1. In one subembodiment, the cell 10 is a prismatic-type cell, and the casing has a substantially rectangular cross-section (not illustrated).

Referring again to FIG. 1, the electrode assembly 12 includes: a positive electrode 16 consisting of, among other things, an electrode active material represented by general formulas (1) through (5) described herein below; a counter negative electrode 18; and a separator 20 interposed between the first and second electrodes 16,18. The separator 20 is preferably an electrically insulating, ionically conductive microporous film, and is composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current collector 22,24 is a foil or grid of an electrically conductive metal such as iron, copper, aluminum, titanium, nickel, stainless steel, or the like, having a thickness of between 5 μm and 100 μm, preferably 5 μm and 20 μm. Optionally, the current collector may be treated with an oxide-removing agent such as a mild acid and the like, and coated with an electrically conductive coating for inhibiting the formation of electrically insulating oxides on the surface of the current collector 22,24. Examples of a suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 μm and 150 μm, preferably between 25 μm and 125 μm, in order to realize the optimal capacity for the cell 10. The positive electrode film 26 is composed of between 80% and 95% by weight of an electrode active material represented by general formulas (1) through (5), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. In one subembodiment, the negative electrode is an alkali metal foil, such as a lithium metal foil. In another subembodiment, the negative electrode film 28 is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons or carbonaceous materials (e.g. graphite), and mixtures thereof. In one embodiment, the intercalation material is graphite.

Referring again to FIG. 1, The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). A negative electrode plate lead 52 provides electrical contact between negative electrode plate 34 and the cylindrical body member closed end 32. A positive electrode plate lead 54 provides electrical contact between positive electrode plate 42 and the positive electrode assembly 40.

A positive terminal cap 40 in electrical communication with the positive electrode 16 via a positive electrode lead 42 provides electrical communication between the positive electrode 16 and the external load (not illustrated). A gasket member 44 sealingly engages the upper portion of the cylindrical body member 30 to the positive terminal cap 40.

A non-aqueous electrolyte (not shown) provides ionic communication between the positive electrode 16 and the negative electrode 18, by transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO_2)_2$; $LiB_{10}Cl_{10}$, lithium bis(oxalate)borate; a lithium lower aliphatic carboxylate; LiCl; LiBr; LiI; a chloroboran of lithium; lithium tetraphenylborate; lithium imides; sodium and potassium analogues of the aforementioned lithium salts; and mixtures thereof. Preferably, the electrolyte contains at least $LiPF_6$.

The following non-limiting examples illustrate the compositions and methods of the present invention.

Example 1

An electrode active material of formula $Na_2CoPO_4F$ was made according to the following reaction scheme.

$$CoCO_3 + Na_2PO_3F + C \rightarrow Na_2CoPO_4F + CO_2$$

To make $Na_2CoPO_4F$, 2.88 g $Na_2PO_3F$, 2.37 g $CoCO_3$, and 0.36 g Ensaco carbon black were micronized for 15 minutes, premixed, pelletized, placed in an oven and heated in a flowing argon atmosphere at a rate of 2° C./min to an ultimate temperature of 800° C. The temperature was maintained for 1 hour, after which the sample was cooled to room temperature and removed from the oven.

Example 2

An electrode active material of formula $Na_2Fe_{0.25}Co_{0.75}PO_4F$ was made according to the following reaction scheme.

$$0.75CoCO_3 + 0.125Fe_2O_3 + Na_2PO_3F + xC \rightarrow Na_2Fe_{0.25}Co_{0.75}PO_4F + 0.75\,0.875CO_2$$

To make $Na_2Fe_{0.25}Co_{0.75}PO_4F$, 1.44 g $Na_2PO_3F$, 0.89 g $CoCO_3$, 0.20 g $Fe_2O_3$, and 0.15 g Ensaco carbon black were micronized for 15 minutes, premixed, pelletized, placed in an oven and heated in a flowing argon atmosphere at a rate of 2° C./min to an ultimate temperature of 625° C. The temperature was maintained for 1 hour, after which the sample was cooled to room temperature and removed from the oven.

Example 3

An electrode active material of formula $Na_2Fe_{0.8}Al_{0.2}PO_4F$ was made according to the following reaction scheme.

$$0.2Al(OH)_3 + 0.4Fe_2O_3 + Na_2PO_3F + xC \rightarrow Na_2Fe_{0.8}Al_{0.2}PO_4F + 0.3H_2O + 0.5CO_2$$

To make $Na_2Fe_{0.8}Al_{0.2}PO_4F$, 1.44 g $Na_2PO_3F$, 0.156 g $Al(OH)_3$, 0.64 g $Fe_2O_3$, and 0.24 g Ensaco carbon black were micronized for 15 minutes, premixed, pelletized, placed in an oven and heated in a flowing argon atmosphere at a rate of 2° C./min to an ultimate temperature of 600° C. The temperature was maintained for 1 hour, after which the sample was cooled to room temperature and removed from the oven.

Example 4

An electrode active material of formula $Na_2MnPO_4F$ was made according to the following reaction scheme.

$$0.5Mn_2O_3 + Na_2PO_3F + xC \rightarrow Na_2MnPO_4F + 0.5CO_2$$

To make $Na_2MnPO_4F$, 1.44 g $Na_2PO_3F$, 0.79 g $Mn_2O_3$, and 0.12 g Ensaco carbon black were micronized for 15 minutes, premixed, pelletized, placed in an oven and heated in a flowing argon atmosphere at a rate of 2° C./min to an ultimate temperature of 700° C. The temperature was maintained for 1 hour, after which the sample was cooled to room temperature and removed from the oven.

Example 5

An electrode active material of formula $Na_2FePO_4F$ was made according to the following reaction scheme.

$$FeSO_4 + Na_2PO_3F + xC \rightarrow Na_2FePO_4F + SO_2$$

To make $Na_2FePO_4F$, 1.44 g $Na_2PO_3F$, 1.52 g $FeSO_4$, and 0.10 g Ensaco carbon black were micronized for 15 minutes, premixed, pelletized, placed in an oven and heated in a flowing argon atmosphere at a rate of 2° C./min to an ultimate temperature of 700° C. The temperature was maintained for 1 hour, after which the sample was cooled to room temperature and removed from the oven.

Example 6

An electrode active material of formula $Li_2FePO_4F$ was made according to the following reaction scheme.

$$0.5Fe_2O_3 + 2LiNO_3 + H_2PO_3F + xC \rightarrow Li_2FePO_4F + H_2O + 1.5CO_2 + 2NO_2$$

To make $Li_2FePO_4F$, 1.00 g $H_2PO_3F$, 0.80 g $Fe_2O_3$, 1.38 g $LiNO_3$, and 0.2 g Ensaco carbon black were micronized for 15 minutes, premixed, pelletized, placed in an oven and heated in a flowing argon atmosphere at a rate of 2° C./min to an ultimate temperature of 750° C. The temperature was maintained for 8 hours, after which the sample was cooled to room temperature and removed from the oven.

Example 7

An electrode active material of formula $Li_2MnPO_4F$ was made according to the following reaction scheme.

$$MnCO_3 + 2LiNO_3 + H_2PO_3F + xC \rightarrow Li_2MnPO_4F + H_2O + 1.5CO_2 + 2NO_2$$

To make Li$_2$MnPO$_4$F, 1.00 g H$_2$PO$_3$F, 1.15 g MnCO$_3$, 1.38 g LiNO$_3$, and 0.2 g Ensaco carbon black were micronized for 15 minutes, premixed, pelletized, placed in an oven and heated in a flowing argon atmosphere at a rate of 2° C./min to an ultimate temperature of 750° C. The temperature was maintained for 8 hours, after which the sample was cooled to room temperature and removed from the oven.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for synthesizing a phosphate-based electrode active material represented by the general formula:

$$A_aM_b(PO_4)_cZ_d,$$

wherein:
(a) A is selected from the group consisting of elements from Group I of the Periodic Table, and mixtures thereof, and $0<a\leq9$;
(b) M includes at least one redox active element, and $1\leq b\leq 3$;
(c) $1\leq c\leq 3$;
(d) Z is selected from the group consisting of a hydroxyl (OH), halogens selected from Group 17 of the Periodic Table, and mixtures thereof, and $0\leq d\leq 4$; and
wherein A, M, Z, a, b, c and d are selected so as to achieve electroneutrality of the phosphate-based electrode active material in its nascent or as-synthesized state comprising the step of reacting two or more starting materials collectively containing an alkali metal; a metal which is redox active in the phosphate-based electrode active material and at least one starting material containing a PO$_3^{3-}$ anion and a counter ion selected from the group consisting of fluoride, chloride, bromide, iodide and mixtures thereof, at a temperature and for a time sufficient to form the phosphate-based electrode active material.

2. The method of claim 1, wherein at least one of the two or more starting materials is selected from the group consisting of alkali metal hydroxides, cyanates, nitrates, nitrites, sulfates, hydrogen sulfates, sulfites, bisulfites, carbonates, bicarbonates, borates, oxides, acetates, oxalates, and mixtures thereof.

3. The method of claim 1, wherein at least one of the two or more starting materials is selected from the group consisting of alkali-metal fluorides, chlorides, bromides, iodides, phosphites, hydrogen phosphites, hydrogen ammonium phosphites, dihydrogen ammonium phosphites, and mixtures thereof.

4. The method of claim 3, wherein at least one of the two or more starting materials is selected from the group consisting of materials represented by the following general formulas: AZ, A$_3$PO$_3$, A$_x$H$_{3-x}$PO$_3$ wherein x>0, A$_2$PO$_3$Z.H$_2$O, A$_2$PO$_3$Z, ANH$_4$PO$_3$Z, A$_4$(PO$_3$Z)$_2$, and APO$_3$Z.2H$_2$O.

5. The method of claim 1, wherein at least one of the two or more starting materials is selected from the group consisting of composition variable M-containing fluorides, chlorides, bromides, iodides, cyanates, nitrates, nitrites, sulfates, hydrogen sulfates, sulfites, bisulfites, carbonates, bicarbonates, borates, phosphites, ammonium phosphites, substituted phosphates, hydroxides, acetates, oxalates, and mixtures thereof.

6. The method of claim 5, wherein at least one of the two or more starting materials is selected from the group consisting of materials represented by the following general formulas: MPO$_3$Z, MHPO$_3$Z, MHPO$_3$, and MPO$_3$.

7. The method of claim 1, wherein at least one of the two or more starting materials contains PO$_3^{3-}$ and a counter ion selected from the group consisting of alkali metals, alkaline metals, transition metals, non-transition metals, ammonium and quaternary ammonium.

8. The method of claim 1, wherein at least one of the two or more starting materials is selected from the group consisting of materials represented by the following general formulas: A$_2$PO$_3$Z, AHPO$_3$Z, (NH$_4$)$_2$PO$_3$Z.H$_2$O, A$_2$PO$_3$Z.H$_2$O, ANH$_4$PO$_3$Z, A$_4$(PO$_3$Z)$_2$ and APO$_3$Z.2H$_2$O.

9. The method of claim 1, wherein A is Li.

10. The method of claim 1, wherein M is selected from the group consisting of Ti, V, Cr, Mn, Fe, Co, Ni, Cu, Nb, Mo, Ru, Rh, Pd, Os, Ir, Pt, Au, Si, Sn, Pb, and mixtures thereof.

11. The method of claim 1, wherein M$_b$=MI$_n$MII$_o$, wherein $1\leq o+n\leq 3$ and each of o and n is greater than zero (o,n>0), wherein MI and MII are each independently selected from the group consisting of redox active elements and non-redox active elements, wherein at least one of MI and MII is redox active.

12. The method of claim 1, wherein Z is F.

13. The method of claim 1, wherein $0<d\leq 4$.

14. The method of claim 1, wherein the phosphate-based electrode active material is selected from the group consisting of LiCo$_{0.8}$Fe$_{0.1}$Al$_{0.025}$Ca$_{0.05}$PO$_{3.975}$F$_{0.025}$, LiCo$_{0.8}$Fe$_{0.1}$Al$_{0.025}$Mg$_{0.05}$PO$_{3.975}$F$_{0.025}$, Li$_{1.025}$Co$_{0.8}$Fe$_{0.1}$Ti$_{0.025}$Mg$_{0.025}$PO$_{3.975}$F$_{0.025}$ LiVPO$_4$F; Li$_{0.6}$VPO$_4$F$_{0.6}$; Li$_{0.8}$VPO$_4$F$_{0.8}$; LiVPO$_4$F; Li$_3$V$_2$(PO$_4$)$_2$F$_3$; LiVPO$_4$Cl; LiVPO$_4$OH; NaVPO$_4$F; Na$_3$V$_2$(PO$_4$)$_2$F$_3$; LiV$_{0.9}$Al$_{0.1}$PO$_4$F; LiFePO$_4$F; LiTiPO$_4$F; and LiCrPO$_4$F.

15. The method of claim 1, wherein the step of reacting two or more starting materials is carried out in a reducing atmosphere.

16. The method of claim 1, wherein the step of reacting two or more starting materials is carried out in the presence of reducing carbon.

* * * * *